United States Patent [19]

Sundquist et al.

[11] Patent Number: 4,888,594

[45] Date of Patent: Dec. 19, 1989

[54] LORAN-C RECEIVER MODULE

[75] Inventors: Robert S. Sundquist; Thomas S. McBride, both of Olathe, Kans.

[73] Assignee: Allied-Signal Inc., Morris Township, Morris County, N.J.

[21] Appl. No.: 331,764

[22] Filed: Apr. 3, 1989

[51] Int. Cl.[4] .................................................. G01S 1/24
[52] U.S. Cl. ..................................... 342/389; 364/452
[58] Field of Search .......................... 342/389; 364/452

[56] References Cited

U.S. PATENT DOCUMENTS 4,445,223  4/1984  Jasper et al. ......................... 342/389
4,584,580  4/1986  Fusino et al. ....................... 342/389

Primary Examiner—Theodore M. Blum
Attorney, Agent, or Firm—Howard G. Massung

[57] ABSTRACT

A Loran-C Receiver Module is provided which utilizes minimum rate sampling means as well as a homodyne receiver at the front end of the Receiver Module to mix down the Loran signal to base band. Once the frequency of the Loran signal is reduced, it is much easier and more economical to perform various functions such as filtering, digitizing, etc. . . . , on the signal.

17 Claims, 1 Drawing Sheet

LORAN-C RECEIVER MODULE

BACKGROUND OF THE INVENTION

1. Field of the Invention

The present invention relates to a Loran-C Receiver Module and more particularly to a module which converts Loran-C RF signals to positional information (latitude/longitude) through the use of a linear receiver and digital signal processing techniques.

2. Description of the Prior Art

Loran is a long-range navigation system in which pulsed signals, received from two or more radio stations, are used by a navigator to determine the geographical position of an airplane or a ship. A standard Loran system consists of a series of radio frequency transmitter stations spaced apart from one another at fixed ground locations. Position is determined by measuring the difference in the time of arrival (TOA) of synchronized, radio frequency pulses transmitted from each of the transmitter stations in the given Loran series or chain. A Loran-C system employs a chain of transmitting stations which includes one master station and two or more secondary stations. The master transmitting station periodically transmits groups of nine Loran pulses. Each secondary transmitting station similarly transmits groups of eight Loran pulses. The above-described Loran pulses are generated by each transmitting station at a group repetition interval (GRI) for that chain. The transmission of pulse groups by the secondary stations is sufficiently delayed in time so as to avoid any overlap in pulse group transmission or reception anywhere in the coverage area of the particular Loran-C chain.

Since the series of pulses transmitted by the master and secondary stations is in the form of pulses of electromagnetic energy which are propagated at a constant velocity, the difference in time of arrival of pulses from a master and secondary station represents the difference in the length of the transmission paths from these stations to the Loran-C receiver.

To determine the location of a receiving station located within the Loran-C coverage area, a Loran-C receiver is synchronized to the group repetition interval (GRI) at which the master and secondary stations of the selected chain transmit at time difference (TD) which is defined as the time of arrival at the receiving station of the secondary station pulse group minus the time of arrival of the master station pulse group. This is determined for each of the secondary stations with respect to the master station. Each of these time differences corresponds to a different line of position (LOP). A line of position is an imaginary line on the surface of the earth exhibiting a constant difference of distance from the master station and a selected station. Thus, from a Loran-C chain having a master station and two secondary stations, two lines of position may be determined. The point at which these two lines of position intersect represents the location of the Loran-C receiver.

When a Loran-C receiver picks up a signal from the master and secondary stations, the signal has already been attenuated by mountains and buildings. Reception of the Loran signal has also been affected by external noise from electric power supply lines. Such influences may cause the signal-to-noise ratio of the Loran signal to drop to 0 db or less. Under these various external conditions, the prior art Loran receivers can not reliably discriminate the Loran pulses from noise.

In order to distinguish the Loran pulses, from the various other signals, a typical Loran system produces sampling pulses synchronized with the Loran pulses. One prior-art Loran receiver having this function is disclosed in Tokkaisho (unexamined published Japanese patent application) 55-2938. It produces a group of sampling pulses at a period of ten microseconds over a group interval of 600 microseconds. In response to each group of sampling pulses the intensity of the received signal is sampled and it is determined whether there is a Loran pulse in the received signal when the sample data exceeds a predetermined level. In more detail, the receiver produces sampling pulses at a period of ten microseconds, each of which includes a pair of pulses separated by 2.5 microseconds. The separation of 2.5 microseconds corresponds to a one quarter period of the carrier, so that one or the other of the pair of sampling pulses will substantially coincide with the peak value of the carrier.

If no Loran pulses are sensed within the interval of 600 microseconds, the timing of the occurrence of the sampling pulse group is shifted by 600 microseconds and sampling is repeated over a new interval of 600 microseconds. If again no Loran pulses are sensed after the shift, the sampling pulse group is again shifted by 600 microseconds until a Loran pulse is detected. This method of sensing Loran pulses is repeated for each of the master and secondary station pulse trains. In order to accurately sense the Loran pulses with this prior art receiver, the sampling pulse group covering 600 microseconds must be repeatedly shifted across a repetition period of 99.7 milliseconds. A relatively long time of about 16.6 seconds is required for that purpose.

In order to attenuate a high noise environment's undesired, interfering signal it is necessary to determine the frequency of the interfering signal prior to or simultaneously with the attenuating signal. One conventional scheme for determining the frequency of an interferer and simultaneously attenuating the same employs a tunable notch filter in the front end of a Loran-C receiver. A metering circuit within the receiver permits the receiver operator to observe the amplitude of the interfering signal. The operator manually tunes the pass band of the notch filter until the interference as indicated on a meter type readout reaches a minimum.

Another conventional approach for determining the frequency of an interfering signal within the Loran-C signal band width employs a voltage controlled oscillator phase locked to the undesired signal. The frequency and phase of the interfering signal are thus automatically tracked without operator intervention.

In a good operating environment a Loran-C receiver can tell the position of the receiver within about 50 feet, but in a poor operating environment the level of accuracy is reduced to about 2500 feet. This increased inaccuracy has long been a problem in the prior art.

SUMMARY OF THE INVENTION

It is an object of the present invention to provide superior Loran-C navigational information at a minimal cost and with increased reliability. This navigational information must avoid the existence of transmitters that interfere with the reception and processing of Loran signals.

A further object of this invention is to provide an improved low cost, rugged and highly reliable Loran-C Receiver Module.

These objects are attained in the present invention by the development of a Loran-C Receiver Module which is capable of taking RF and producing latitude/longitude covariance, groundspeed, and track angle. The module utilizes cross chain navigation to eliminate chain transition and to fill current gaps in the Loran-C coverage. The module also makes use of digital signal processing techniques which allow interfering transmitter signals to be filtered out in hardware in a cost effective manner.

All of the above is attained simply and economically in the present invention because the present invention utilizes a homodyne receiver at the front end of the Receiver Module to mix down the Loran signal to base band. Once the frequency of the Loran signal is reduced, it is much easier to perform various functions such as filtering, digitizing, etc. . . . , on the signal.

DETAILED DESCRIPTION OF THE INVENTION

Figure 1:
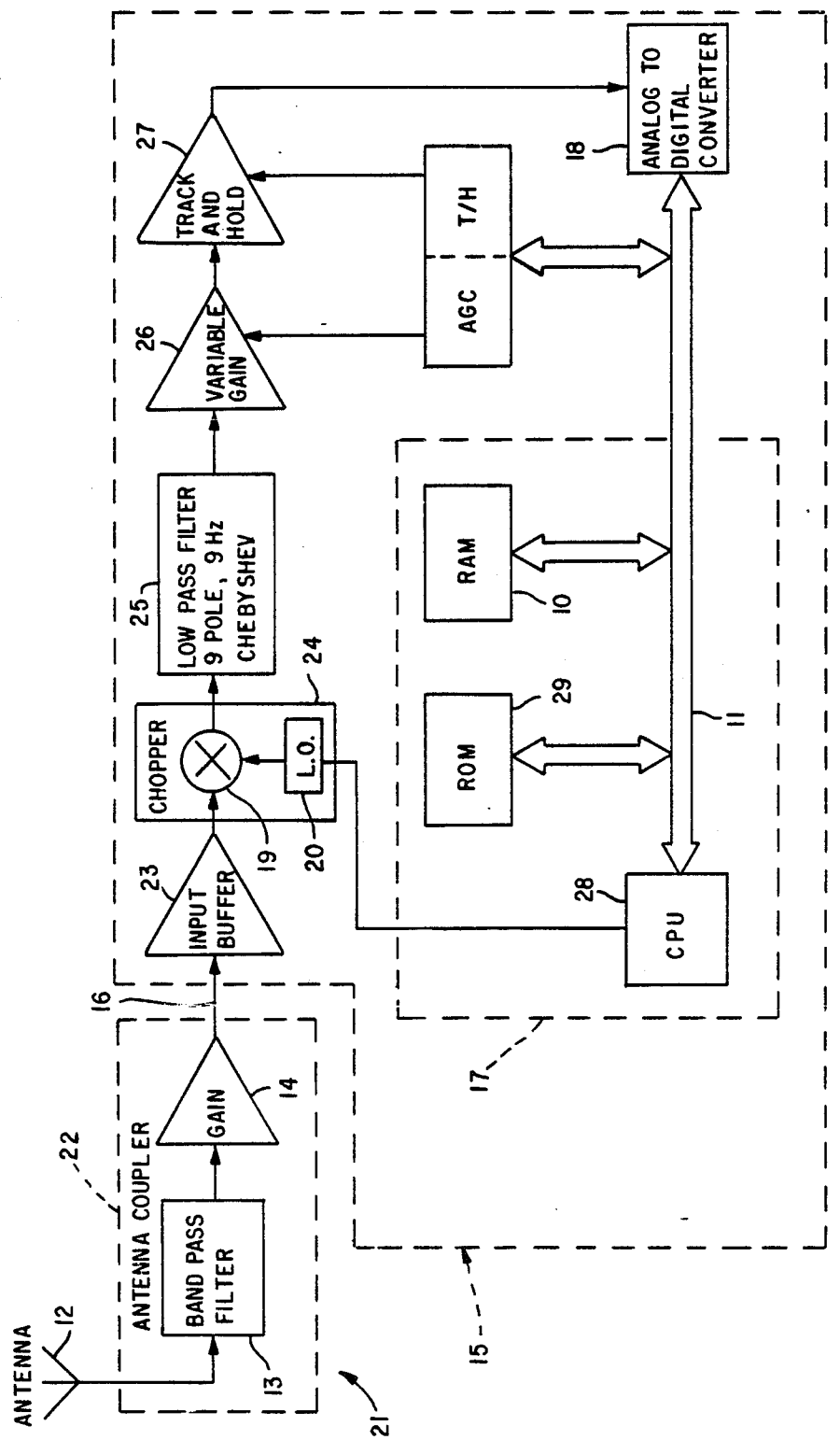
FIG. 1 illustrates a block diagram of the present invention.

As illustrated in FIG. 1, the Loran-C Receiver Module 21 comprises an antenna coupler 22, an input buffer 23, a homodyne receiver 24, a low pass filter 25, a variable gain control 26, and a track and hold control circuit 27. These components interface with a computer 17 which comprises a CPU 28, ROM 29, RAM 10, and an interface bus 11.

The operation of the Loran-C Receiver Module begins when a signal is received by an antenna 12 which interfaces to the antenna coupler 22. The antenna coupler uses a wide band, two poles, band pass filter 13 for attenuation to very low frequency (VLF) (15 to 30 Khz) and non-directional beacon (NDB) (200 Khz and above) stations. A low noise FET amplifier 14, with its gain set as high as possible while maintaining linearity, follows the filter 13. Because of noise considerations, the interface between the antenna coupler 22 and the base 15 of the Loran-C Receiver Module 21 is through a twisted, shielded pair 16. DC power for the antenna coupler 22 shares the RF signal line in the twisted shielded pair 16.

From the antenna coupler 22, the RF signal flows to the input buffer 23 which adds again and transformer coupling to the signal. Gain, in addition to the gain of the antenna coupler 22, is possible because of the large power supply (not shown) available in the base 15 of the Loran-C Receiver Module 21. After the input buffer 23, the signal flows to an important component of the invention, the homodyne receiver 24, which employs a mixer 19 with a local oscillator 20 at the RF carrier frequency therefore converting the center frequency to 0. This homodyne receiver 24 is controlled by the computer 17 which outputs a 100 Khz signal to the local oscillator 20. The resultant output of the homodyne receiver 24 is a base band Loran signal (envelope). It is much simpler and more economical to work with a signal having these base band characteristics.

The next step, the low pass filter 25, serves to attenuate continuous wave interference (CWI). The use of an economical, simple, low pass filter 25 is one of the advantages of operating at base band. Note that it is only necessary to reduce the signal-to-noise (S/N) ratio the extent necessary for digitizing because additional CWI filtering resides in software. (A hard-limiting receiver requires that a signal-to-noise ratio of approximately 0db be maintained at the input to the first limiting stage). To adequately pass the base band Loran signal, while attenuating the CWI, requires a ninth order, nine Khz Chebyshev filter which only requires capacitors and resistors. No filter alignment is required. Note that this approach can accommodate a ratio as high as $-79$ db which is within 1db of the technical requirement. Also note that this simplified approach does not require retuning of the notch filters should the frequency of the CWI change or more CWI come into existence.

The next step, the variable gain control 26, is formed by multiple discrete gain stages. The computer 17 controls the amount of gain present at any given time and the gain is selectable from 0 to $+80$ db in 1 db increments. The track/hold control circuit 27 tracks the output of the variable gain stages, and holds (on command from the computer 17) the signal for analog to digital conversion. A 10 bit analog to digital converter 18 is commanded by the computer 17 to digitize the track/hold output (i.e. when a Loran pulse is expected to occur).

To control the above hardware the following software is required. First we have initialization is which the RAM 10 is cleared and the flags and variables are initialized to their proper start up values. Communication with the CPU 28 is performed via the external I/O code. The CPU 28 receives initial position, station locations, heading, true air speed, mode (enroute/approach), manual additional secondary factors (ASF) (corrections due to signal propagation) (approach mode only), and manual GRI/station. The CPU 28 outputs present latitude, present longitude, position covariance, flags, ground speed, track angle, and GRI/station usage. The hardware control code determines/sets the receiver gain and controls the phase of the local oscillator 20. The hardware control code receives information pertaining to the desired stations, the desired local oscillator phase and local oscillator velocity for each station and outputs gain data to external latches and control data to an internal timer.

A calibration code is required to periodically calibrate the low pass filter transfer function. The calibration code takes sample data during filter calibration, and controls the timer and external hardware to produce a step input to the low pass filter. This is used to compute the response of the filter to a Loran signal envelope. The date sampling software receives data from the A/D converter 18 and controls the A/D converter 18. The data must be sampled at a regular rate, such as every 25 microseconds. The data sampling software also outputs control data to the track and hold control circuit 27. The CWI search software searches for and determines the frequency of CWI. The CWI search software receives sample data and outputs amplitudes and frequencies of CWI. The Search code performs the initial search for exiting Loran signals. GRI to be searched is inputted to the search code and the times of arrival (TOAs) of existing signals is outputted from the search code. The Acquisition Algorithm takes the TOAs (plus/minus 250 microseconds) from the signal search algorithm and prepares them for the linear track algorithm. The outputs from the Acquisition Algorithm are TOAs (plus/minus 5 microseconds) and quadrature and in-phase amplitudes for groundwaves and skywaves.

The Tracking Code represents a linear algorithm which tracks the signals after the Acquisition Algorithm acquires them. Initial signal parameters are inputted to the Tracking Code and signal parameters (TOAs and amplitudes) are outputted from the Tracking Code. A Propagation Mode computer the expected signal TOA based on the distance from the station. To perform this function the present latitude/longitude and the station latitude/longitude is required. The expected signal propagation time is outputted from the Propagation Model.

A Position Filter computes and filters the present position based on the signal TOAs. The outputs from the Position Filter are filtered latitude/longitude, groundspeed and track angle. The Station Selection and Validation software selects the best stations for use based on the present position and validates them based on amplitude, blink, and skywave criteria. This software requires the present latitude/longitude and signal parameters to provide the stations to be used and the station flags.

The Loran-C Receiver Module also includes built in test equipment (BITE). This equipment performs checks of the RAM 10, ROM 29, CPU 28, and receiver hardware. If a malfunction occurs, an error flag is transmitted from the BITE. The Scheduler Software coordinate the execution for the various software modules by receiving information from the real time counter. The Scheduler Software sends out the software module start times and the software interrupts.

A major component of the software required for the Loran-C Receiver Module is the Tracking Code. The Tracking Code is a linear tracking algorithm which is based on a parametric representation as a combination of groundwaves and skywaves, each of which is a function of envelope time of arrival, in-phase amplitude, and quadrature amplitude.

Tge groundwave envelope time of arrival
Agq groundwave quadrature component amplitude
Agi groundwave in-phase component amplitude
Tse skywave envelope time of arrival
Asq skywave quadrature component amplitude
Asi skywave in-phase component amplitude In-phase and quadrature are relative to a time reference established by the phase of the local oscillator, with the quadrature component lagging the in-phase component by 90 degrees. The groundwave amplitude, Ag, and carrier time of arrival, Tgc, may be computed as follows:

|  | Ag = (Agq2 + Agi2)**.5 |
| --- | --- |
|  | Tgc = −(10.E-6/6.283)*ATAN2(Agq, Agi) + (10.E-6*N) |
| NOTE: | Fortran conventions used |
| * | indicates raising to a power |
| 10.E-6 | means 10 times (10 raised to the −6 power) |
| ATAN2(Y,X) | = arctan (y/x + K(pi) where arctan is in the range −pi to +pi, K = 0 for X 0, K = 1 for X 0 |

N in the above equation is any integer number, and represents an ambiguity in the carrier time of arrival. This ambiguity is resolved by choosing N to minimize the ECD, which is the difference between the envelope an carrier times of arrival, or if an a prior estimate of ECD is available, the ECD error is minimized.

Eight samples are taken of each pulse, starting 125 uses after the beginning of the unfiltered pulse and spaced at 25 usec intervals. The eight pulses in each GRI are added or subtracted based on the phase code. The phase of the local oscillator is shifted for each GRI to look alternately at the in-phase and quadrature components. This results in 16 data points for each 2-GRI period. The expected values of these data points are computed based on the current estimates of the signal parameters. The partial derivative of each data point with respect to each of the signal parameters is computed. The data points are related to the signal parameters by the linear approximation:

$$E = HX$$

where is the difference between the actual and estimated data points, H contains the partial derivatives of the data points with respect to the signal parameters, and X is the difference between the actual and estimated signal parameters. The estimated signal parameters, Z are updated by each set of measurements using the gain matrix, K, as follows:

$$Z = Z + KE.$$

The gain matrix K is updated periodically based on the H matrix and the estimated noise level.

It is not intended that this invention be limited to the hardware or software arrangement, or operational procedures shown disclosed. This invention includes all of the alterations and variations thereto as encompassed within the scope of the claims as follows.

We claim:

1. A Loran-C receiver module comprising: antenna coupler means for receiving a received signal from
   an antenna; homodyne receiver means connected to said antenna coupler
   means for converting a center frequency of an output of said antenna coupler means, said homodyne receiver means comprising, mixter means coupled to input buffer means which receives an output from said antenna coupler means and local oscillator means at the RF carrier frequency and coupled to said mixer means;
   minimum rate sampling means coupled to said homodyne receiver means for periodically sampling an output of said homodyne receiver means, said minimum rate sampling means comprising, low pass filter means which receives an output from said homodyne receiver means and attenuates continuous wave interference, variable gain control means which receives an output from said low pass filter means, track and hold control circuit means which tracks an output from said variable gain control means and holds said output and analog to digital converter means; and,
   computer means coupled to said homodyne receiver means and said minimum rate sampling means for processing a sampled output from said minimum rate sampling means and for controlling said Loran-C receiver module.

2. A Loran-C receiver module as defined in claim 1 wherein said antenna coupler means comprises:
   band pass filter means for attenuating to very low frequency and non-directional beacon stations; and,
   amplifier means coupled to said band pass filter means.

3. A Loran-C receiver module as defined in claim 2 wherein said amplifier means comprises:
   a low noise FET amplifier having its gain set as high as possible while maintaining linearity.

4. A Loran-C receiver module as defined in claim 1 wherein said homodyne receiver means is controlled by said computer means which outputs a 100Khz local oscillator signal.

5. A Loran-C receiver module as defined in claim 1 wherein said homodyne receiver means outputs a base band Loran signal.

6. A Loran-C receiver module as defined in claim 1 wherein said low pass filter means comprises:
   a ninth order, nine Khz Chebyshev filter.

7. A Loran-C receiver module as defined in claim 1 wherein said variable gain control means comprises:
   multiple discrete gain stages.

8. A Loran-C receiver module as defined in claim 7 wherein said computer means controls amount of gain present and gain is selectable from 0 dB in 1 dB increments.

9. A Loran-C receiver module as defined in claim 1 wherein said track and hold control circuit means is controlled by said computer means.

10. A Loran-C receiver module as defined in claim 1 wherein said analog to digital converter means comprises:
    a 10 bit analog to digital converter and is commanded by said computer means to digitize an output from said track and hold control circuit means.

11. A Loran-C receiver module as defined in claim 1 wherein said computer means interfaces with said homodyne receiver means, said variable gain control means, said track and hold control circuit means, and said analog to digital converter means.

12. A Loran-C receiver module as defined in claim 1 wherein said computer means comprises:
    central processing unit means;
    read only memory means;
    random access memory means; and,
    interface bus means coupled to said central processing unit means, said read only memory means and said random access memory means.

13. A Loran-C receiver module as defined in claim 12 wherein said computer means further comprises:
    a 16 Mhz clock input.

14. A Loran-C receiver module as defined in claim 13 wherein said computer means further comprises:
    an external interface I/O.

15. A Loran-C receiver module as defined in claim 12 wherein said central processing unit means comprises:
    an Intel 80186.

16. A Loran-C receiver module as defined in claim 12 wherein said computer means further comprises:
    initialization means for clearing said random access memory means and for initializing flags and variables to their proper start up values;
    communication means for sending data to said central processing unit means and for receiving data from said central processing unit means;
    hardware control means for determining and setting gain of said receiver module and for controlling phase of local oscillator means;
    calibration means for calibrating a low pass filter transfer function;
    data sampling means for controlling analog to digital converter means;
    continuous wave interference search means for searching and determining a frequency of continuous wave interference;
    initial search means for performing an initial search for existing Loran signals;
    acquisition means for processing an output from said initial search means and for preparing said output for tracking means;
    tracking means for tracking signals after they were acquired by said acquisition means, said tracking means being represented as a combination of groundwave and skywave, each of which is a function of envelope time of arrival, in-phase amplitude and quadrature amplitude;
    propagation model means for computing an expected signal time of arrival based on distance from a station;
    position filter means for computing and filtering present position based on said expected signal time of arrival;
    station selection and validation means for selecting a best station for use based on present position and validating said best station based on amplitude, blink and skywave criteria; and,
    scheduler means for coordinating execution of various software modules.

17. A Loran-C receiver module as defined in claim 16 wherein said computer means further comprises:
    built in test equipment means for performing checks on said random access memory means, said read only memory means, said central processing unit means, said antenna coupler means, said homodyne receiver means and said minimum rate sampling means.

* * * * *